P. G. ALLENDORF.
MOTOR VEHICLE.
APPLICATION FILED SEPT. 24, 1915.

1,211,907.

Patented Jan. 9, 1917.
2 SHEETS—SHEET 1.

INVENTOR
Peter G. Allendorf

BY Jas. H. Churchill
ATTORNEY

P. G. ALLENDORF.
MOTOR VEHICLE.
APPLICATION FILED SEPT. 24, 1915.

1,211,907.

Patented Jan. 9, 1917.
2 SHEETS—SHEET 2.

INVENTOR
Peter G. Allendorf

BY Jas. H. Churchill
ATTORNEY

UNITED STATES PATENT OFFICE.

PETER G. ALLENDORF, OF WESTWOOD, MASSACHUSETTS.

MOTOR-VEHICLE.

1,211,907.
Specification of Letters Patent.
Patented Jan. 9, 1917.

Application filed September 24, 1915. Serial No. 52,504.

*To all whom it may concern:*

Be it known that I, PETER G. ALLENDORF, a citizen of the United States, residing in Westwood, in the county of Norfolk and State of Massachusetts, have invented an Improvement in Motor-Vehicles, of which the following description, in connection with the accompanying drawings, is a specification, like characters on the drawings representing like parts.

This invention relates to an automobile and more particularly to the body portion of the same, and has for its object to provide a novel construction of body, which enables a commercial automobile or like motor vehicle to be converted into a pleasure car having a body which is closed in whole or in part and which is stylish and attractive in appearance. To this end, the body portion of the automobile is provided with side pieces or panels of substantial height and with a tail board or rear end panel of substantially the same height, one of the said side panels having a door at its front end.

Extended above the side panels are uprights which are spaced apart and support a top, which is curved or inclined in opposite directions as will be described, and the said uprights support a framework provided with means for securing in position the upper ends of windows or curtains according to the desires of the owner of the vehicle. The windows are removable and provided with means for engaging the side panels of the body portion so as to be supported thereby.

These and other features of this invention will be pointed out in the claims at the end of this specification.

Figure 1:
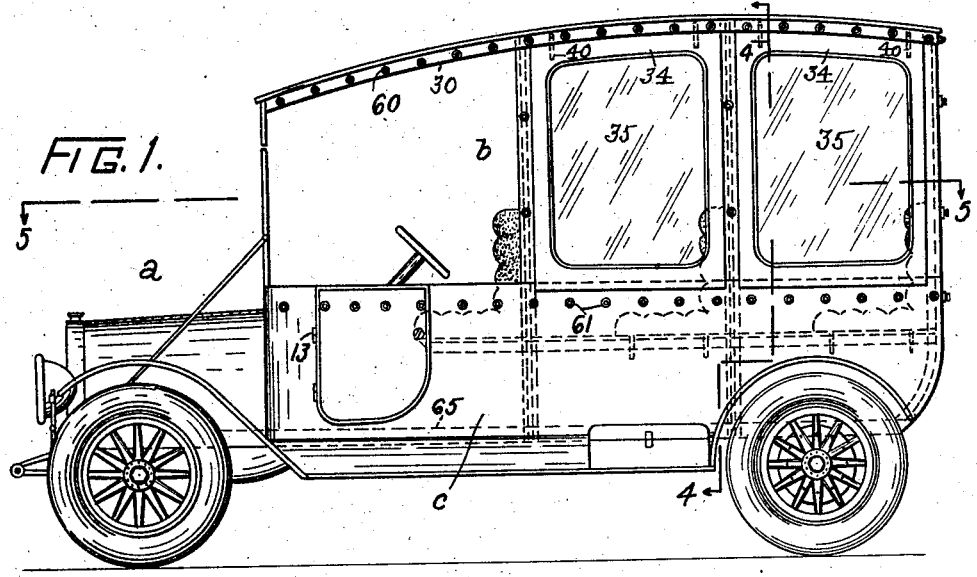
Figure 2:
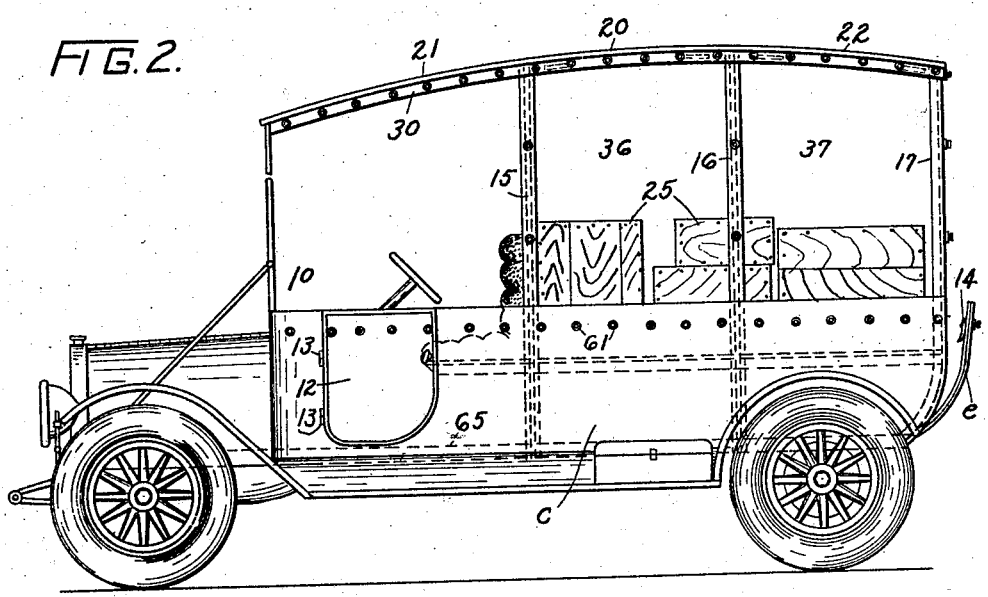
Figure 3:
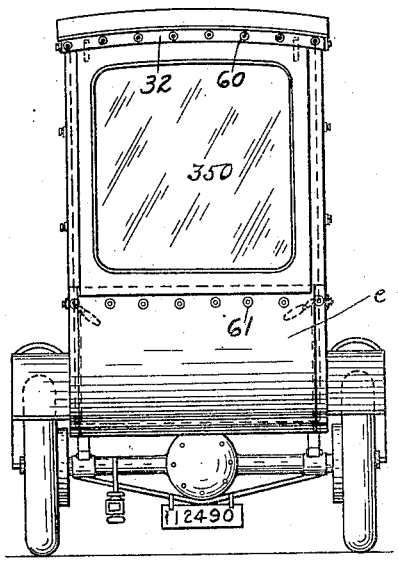
Figure 4:
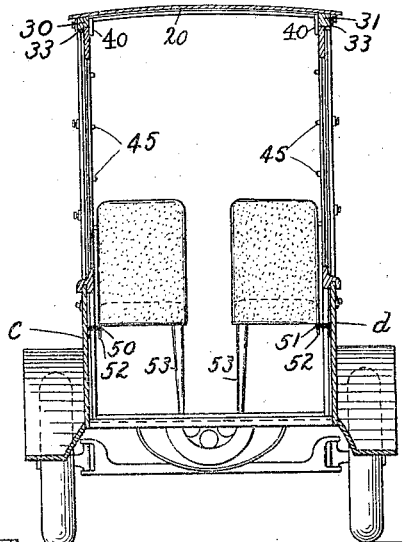
Figure 5:
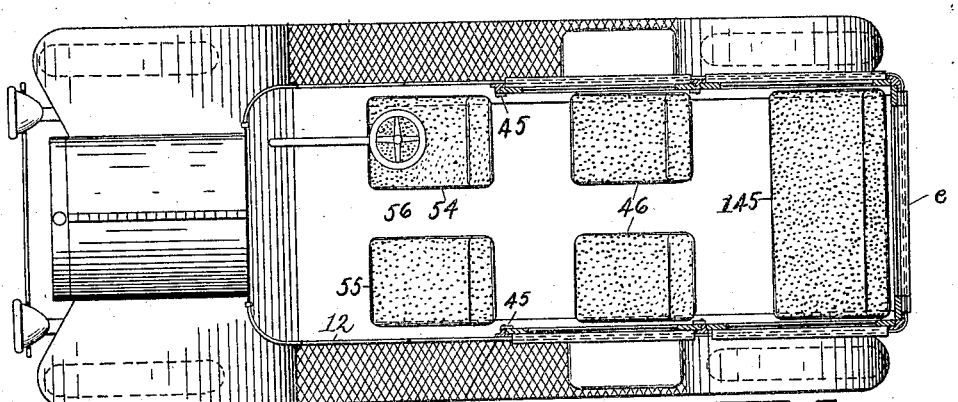

Figure 1 is a side view of an automobile embodying this invention, showing the same as provided with a closed body ready for use as a pleasure vehicle. Fig. 2, a side elevation of the automobile, with an open body and in condition for commercial use. Fig. 3, a rear elevation of Fig. 1. Fig. 4, a transverse section on the line 4—4, Fig. 1. Fig. 5, a horizontal section on the line 5—5, Fig. 1 and Figs. 6 and 7, details in section to be referred to.

Referring to the drawing, $a$ represents an automobile of any usual or suitable construction except as to its body portion $b$, which in accordance with this invention is provided with side pieces or panels $c, d$, and a rear end panel or tail board $e$, which are of substantial height and materially higher than the sides and tail board of the ordinary auto-delivery wagon.

The side panels $c, d$, are made continuous or unbroken from the rear end of the vehicle to the dasher 10 thereof, and one of the side panels as $c$ is provided with a door 12, which is hinged at 13 so as to afford an opening into the vehicle. The tail board $e$ is pivoted at its lower end, so as to be capable of being lowered, after the manner represented in Fig. 2, and said tail board is provided with suitable fastening devices 14 for securing it in its closed or upright position.

The body portion $b$ is provided on its opposite sides with uprights or posts, herein shown as three in number on each side and marked 15, 16, 17. These posts may be of wood or of metal, and the posts 15, 16, may be T-irons and the rear corner posts 17 may and preferably will be curved on their outer surfaces and provided with longitudinally extended rabbets or recesses 18, 19, on their inner surfaces (see Fig. 7), which are substantially at right angles to each other for a purpose as will be described.

The uprights 15, 16 and 17, support a roof or top 20, of any suitable material and preferably of thin sheet metal, and the intermediate posts 16, are made slightly longer than the posts 15, 17, so as to provide the roof or top 20 with oppositely inclined and preferably curved sections 21, 22, of unequal length, the longer section 21 extending beyond the front side posts 15 and preferably beyond the dasher 10, while the shorter section 22 extends beyond the rear corner posts 17. By this construction and arrangement, the vehicle is provided with a top which has the lines of the more expensive limousine bodies, and effectively sheds the water.

The vehicle as thus far described is open at its sides and rear end above the body panels or sides $c, d$, as represented in Fig. 2, and in this condition it is available for uses as a delivery vehicle by grocers and other merchants, and in Fig. 2, the vehicle is represented as loaded with boxes 25 or other merchandise.

The vehicle in the condition represented in Fig. 2, can be used as a delivery vehicle on week days, and on Sundays, holidays or at times during the week, the owner may desire to use the vehicle for pleasure purposes, and in order that the delivery vehicle may be converted into a pleasure vehicle of attractive appearance, provision is made whereby this conversion may be effected in a short time and at a minimum expense. To this end I employ a framework which comprises side bars or strips 30, 31, and a rear cross bar 32, and secure said frame to the underside of the top 20 substantially in the planes of the side and end panels of the body portion, and provide the members of the said frame with a longitudinally extended rabbet 33 shown best in Figs. 4 and 6, for the reception of the upper cross bar 34 of the sash of a glass window 35, the lower cross bar of said window sash being constructed so as to straddle the upper edge of the side panels c, d, and of the rear panel e.

Figure 6:
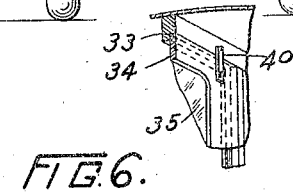
Figure 7:
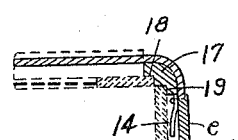

In the present instance, each side of the vehicle is provided with two spaces 36, 37, between the posts 15, 16, 17, and these spaces are closed by the removable glass windows 350, as represented in Fig. 1, and the space at the rear of the vehicle above the tail board e is closed by a window 35. These windows may be firmly secured in any suitable manner, and in the present instance I have shown them as secured at their upper ends by buttons or clasps 40, which are pivoted to the supporting frame and are capable of being turned from a substantially horizontal position into a substantially vertical position, as shown in Figs. 1 and 6. The side windows 35 are designed to have the vertical bars of their sashes bear against the posts or uprights 15, 16, 17, and to have their inner surfaces substantially flush with the inner surfaces of the side and corner posts, and the rear end window has the side bars of its frame fitted into the rabbets 19 in the corner posts 17. If desired, the side uprights or posts 15, 16, may have secured to them suitable buttons 45 or other fastening devices for engaging the side bars of the window frames. It will thus be observed, that when the side and rear windows are secured in position as represented in Figs. 1, 3 and 5, the delivery motor wagon or car shown in Fig. 2, is converted into an attractive motor vehicle or automobile, approximating in appearance one provided with a limousine body as represented in Fig. 1.

Provision is made for providing the closed rear portion of the body with seats, and in the present instance I have shown the closed portion of the body as provided with a cross seat 145 (see Fig. 5) at the rear end, and with side seats 46 suitably spaced from said rear seat.

To sustain the seats 145, 46 and yet permit their being readily removed, when it is desired to use the vehicle as a delivery wagon or car, the side panels c, d, have fastened to them on their inner sides, angle irons 50, 51, which are extended longitudinally of the body and are provided in their horizontal member with suitable holes for the reception of lugs or pins 52 attached to the seats 145, 46. The rear seat 145 may be supported by both angle bars 50, 51, and the seats 46 by said angle bars and legs or posts 53 attached to the seats. The portion of the body in front of the upright 15 is provided with an individual seat 54 for the driver, and if desired with an additional seat 55, which is separated from the driver's seat by a space 56, which affords a passageway into the rear portion of the vehicle when the latter is used as a pleasure vehicle.

If the owner of the car should not care to have the glass windows on account of the increased cost, provision is made for the use of detachable curtains on the same body, and to this end the window supporting frame is provided with buttons or other fastening devices 60 on the outer side of the same, and the side panels c, d, and the rear panel e are provided with similar fastening devices 61, by means of which curtains may be attached to the outside of the car body.

The side panels c, d are made materially higher than the side panels of an ordinary delivery wagon, such as now commonly used which increase in height has the effect of increasing the carrying capacity of the vehicle when used as a delivery wagon, as shown in Fig. 2, inasmuch as the merchandise can be piled up to a greater height without danger of being thrown out in transit, and which also has the effect of shortening up the distance between the upper edges of the side panels and the tail board and the top 20 of the vehicle, thereby avoiding the use of abnormally large windows, which would be too bulky to handle easily, and enabling window frames to be used which approximate closely the size and appearance of the windows of a limousine or other closed body of pleasure vehicles.

The rear ends of the side panels c, d, the rear corner posts 17 and the panel e may and preferably will be curved as represented in Figs. 1 and 2, so as to impart to the rear portion of the delivery vehicle the appearance of the expensive closed pleasure vehicles. The chassis 65 and other parts of the motor vehicle are and may be of any suitable construction.

By providing the lower cross bar of the window sash with a groove in its bottom, as represented in Figs. 1 and 4, the window is not only easily applied to the panel upon which it rests, as the inner wall of the groove bears against the inner side of the panel and leaves both hands of the operator free for adjusting the upper part of the window, but the outer wall of the groove forms a water shed on the outside of the panel and prevents rain from beating into the interior of the body portion.

Claims:

1. In a motor vehicle of the character described, in combination, a chassis provided with a dasher near its front end, a body portion supported by said chassis and provided with side panels of substantial depth and of substantially uniform height throughout their length and extended from the rear of the chassis to near the said dasher, one of said side panels having a door at its front end for entrance to the driver's compartment, a rear panel of substantially the same height as said side panels and hinged at its lower edge to be lowered, stationary side uprights extended above said side panels and separated to leave spaces, a top supported by said uprights, a window-supporting frame located under said top substantially in line with said side and rear panels and provided on its inner side with recesses, removable windows to fill the spaces between said side uprights and the space above said rear panel, said windows being supported at their bottoms by said side panels and rear panel and having their upper ends fitted into said recesses, and means for securing said windows in their closed position in fixed relation to said body portion.

2. In a motor vehicle of the character described, in combination, a chassis to support the motor of the vehicle, a body portion supported by the chassis behind the motor and provided with a dasher and with side panels extended from the dasher to the rear end of the chassis and one of which is provided with an opening adjacent to said dasher, and a movable rear panel, stationary uprights extended above said side panels, a top supported by said uprights, and a window-supporting frame located beneath said top substantially in line with said side panels and said rear panel and provided on its inner side with recesses extended longitudinally of said frame.

3. In a motor vehicle of the character described, in combination, a body portion provided with side panels of substantially uniform height throughout their length, one of the said side panels having an entrance opening in it near its front end, uprights extended above said panels, a top supported by said stationary uprights, each of the rear uprights being provided with longitudinally extended rabbets or recesses substantially at right angles to each other, and a window-supporting frame located below said top substantially in line with said side panels and provided with longitudinally extended rabbets or recesses on the inner sides of said frame.

4. In a motor vehicle of the character described, in combination, a chassis provided with a dasher near its front end, a body portion supported by said chassis at the rear end of the dasher, and provided with side panels of substantial height throughout their length and separated at their rear ends by an opening which extends from side panel to side panel, a rear panel of substantially the same height as the side panels and extended from one side panel to the other side panel and pivoted at its lower end so as to be lowered, said side panels being extended from said dasher to the rear of the chassis and one of said side panels having at its front end an opening for entrance into the vehicle, from the side thereof and behind said dasher, stationary uprights extended above said side panels, a top supported by said uprights, and a window-supporting frame located below said top in proximity thereto and substantially in line with said side panels and separated from the upper edge of the side panels by window openings of a size to impart to the body portion the appearance of a limousine body.

5. In a motor vehicle of the character described, in combination, a body portion provided with side panels of substantial height and with a rear panel of substantially the same height and pivoted at its lower end and extended from panel to panel, stationary uprights extended above said side panels, a top supported by said uprights, windows grooved on their underside to fit over and straddle the top edge of said panels and having the inner walls of said grooves capable of engaging the inner side of said panels when the windows are closed from within the vehicle and having the outer walls of said grooves extended below the top edge of said panels on the outer side thereof to form water sheds on the outer side of the panels, and below the top edge thereof, and means for securing the upper ends of the windows in fixed position.

6. In a motor vehicle of the character described, in combination, a chassis provided with a dasher near its front end, a body portion supported on said chassis at the rear of said dasher and provided with side panels of substantial height and having curved rear ends, said side panels being extended from said dasher to the rear of said chassis, and one of which is provided with a door at its front end at the rear of said dasher, a rear panel curved to conform to the curved rear ends of said side panels and pivoted at its lower end, side uprights extended above said side panels between their ends and corner uprights extended above the side panels and having their lower portions curved to conform to the curve of the rear ends of the side panels and to the curve of the rear panel, a top supported by said uprights, and windows supported at their bottoms by said panels.

7. In a motor vehicle of the character described, in combination, a body portion provided with side panels and with a movable rear end panel of substantially uniform depth for their entire length, side uprights substantially T-shaped in cross section secured in fixed relation to said body portion, rear end uprights, each having rabbets substantially at right angles to each other, one of the uprights on each side being higher than the other uprights, a top supported by said uprights and provided with oppositely inclined sections, a window-supporting frame located below said top substantially in line with said side and end panels, removable windows resting on said side and end panels and against said uprights and said window-supporting frame, and means for securing the said windows to said supporting frame.

In testimony whereof, I have signed my name to this specification.

PETER G. ALLENDORF.